(12) United States Patent
Schneider et al.

(10) Patent No.: US 10,892,985 B2
(45) Date of Patent: *Jan. 12, 2021

(54) METHOD AND SYSTEM FOR PERFORMING STATE-AWARE SOFTWARE DEFINED NETWORKING

(71) Applicant: NEC Laboratories Europe GmbH, Heidelberg (DE)

(72) Inventors: Fabian Schneider, Heidelberg-Bahnstadt (DE); Faqir Zarrar Yousaf, Leimen (DE)

(73) Assignee: NEC CORPORATION, Tokyo (JP)

( * ) Notice: Subject to any disclaimer, the term of this patent is extended or adjusted under 35 U.S.C. 154(b) by 52 days.

This patent is subject to a terminal disclaimer.

(21) Appl. No.: 15/997,862

(22) Filed: Jun. 5, 2018

(65) Prior Publication Data

US 2019/0372894 A1 Dec. 5, 2019

(51) Int. Cl.
*H04L 12/721* (2013.01)
*H04L 12/751* (2013.01)

(52) U.S. Cl.
CPC .............. *H04L 45/38* (2013.01); *H04L 45/02* (2013.01)

(58) Field of Classification Search
CPC ....... H04L 45/745; H04L 45/04; H04L 29/08; H04L 29/06; H04L 45/021; H04L 69/324;

(Continued)

(56) References Cited

U.S. PATENT DOCUMENTS 7,227,842 B1 * 6/2007 Ji ............................ H04L 45/00
370/235
7,260,096 B2 * 8/2007 Basso ..................... H04L 45/00
370/392

(Continued)

FOREIGN PATENT DOCUMENTS

WO WO 2015000517 A1 1/2015
WO WO 2018171889 A1 9/2018

OTHER PUBLICATIONS

Roberto Bifulco, et al., "Improving SDN with InSPired Switches", SOSR '16 Proceedings of the Symposium on SDN Research, Artile No. 11, Mar. 14-15, 2016, pp. 1-12.

(Continued)

*Primary Examiner* — Hanh N Nguyen
(74) *Attorney, Agent, or Firm* — Leydig, Voit & Mayer, Ltd.

(57) ABSTRACT

A forwarding element includes a control engine and a forwarding table. The control engine includes a command template that includes a stateful interaction instruction. The forwarding table includes a rule entry that defines a match description and an action instruction. The forwarding element is configured to: receive a packet; determine packet attributes based on the packet; compare the packet attributes to the match description to determine whether there is a rule match, execute the action instruction in response to determining there is the rule match, which includes causing a trigger signal to be sent to the control engine, the trigger signal corresponding to the command template, and perform (Continued)

a stateful interaction on the packet according to the stateful interaction instruction in response to receiving the trigger signal.

15 Claims, 6 Drawing Sheets

(58) Field of Classification Search
CPC ..... H04L 69/22; H04L 41/0893; H04L 43/14; H04L 63/0254; H04L 12/24; H04L 47/2441; H04L 45/00; H04L 63/0263; H04L 45/38; H04L 45/64; H04L 45/74; H04L 45/02; H04L 49/254; H04L 69/164; H04L 12/721; H04L 45/20; H04L 45/586; H04L 45/54; H04L 63/029
See application file for complete search history.

(56) References Cited

U.S. PATENT DOCUMENTS

| | | | | |
|---|---|---|---|---|
| 7,299,296 B1 * | 11/2007 | Lo | ............................ | H04L 12/66 370/231 |
| 7,522,627 B2 * | 4/2009 | Lam | ........................ | H04L 45/04 370/427 |
| 7,525,958 B2 * | 4/2009 | Kumar | .................... | H04L 29/06 370/356 |
| 8,098,677 B1 * | 1/2012 | Pleshek | ................... | H04L 43/12 370/351 |
| 8,570,866 B2 * | 10/2013 | Buckman | ............ | H04L 12/1485 370/230 |
| 8,806,058 B1 * | 8/2014 | MacKie | .................. | H04L 45/00 709/238 |
| 9,461,967 B2 * | 10/2016 | Zuk | ......................... | H04L 69/22 |
| 9,893,997 B2 * | 2/2018 | Ganji | ..................... | H04L 45/745 |
| 10,305,798 B2 * | 5/2019 | Pongracz | ................ | H04L 45/74 |
| 2016/0134727 A1 | 5/2016 | Merkel et al. | | |
| 2017/0250869 A1 * | 8/2017 | Voellmy | ............... | H04L 41/0893 |
| 2020/0021519 A1 * | 1/2020 | Schneider | ............. | H04L 49/254 |

OTHER PUBLICATIONS

Giuseppe Bianchi, et al., OpenState: Programming Platform-independent Stateful OpenFlow Applications Inside the Switch, ACM SIGCOMM Computer Communication Review, vol. 44, No. 2, Apr. 2014, pp. 1-7.

Open Networking Foundation, OpenFlow Switch Specification, version 1.3.5, ONF TS-023, Mar. 26, 2015, pp. 1-177.

Open vSwitch Manual, ovs-ofctl(8), Aug. 2, 1990, pp. 1-37.

\* cited by examiner

METHOD AND SYSTEM FOR PERFORMING STATE-AWARE SOFTWARE DEFINED NETWORKING

FIELD

The present invention relates to software defined networking using state-aware packet forwarding.

BACKGROUND

Just a few years ago, it was normal to configure network devices using proprietary interfaces, differing across vendors, device types (switches, routers, firewalls, load balancers, etc.), and even different firmware releases for the same devices. Managing heterogeneous multi-vendor networks of non-marginal scale was extremely difficult, and required significant expertise.

Software defined networking (SDN) emerged as approach to overcome the problems of heterogeneous network management by enabling programmatically efficient network configuration. SDN's approach is to centralize network intelligence by disassociating the forwarding process of network packets (Data Plane) from the routing process (Control Plane). The Control Plane includes one or more controllers where the intelligence of the network is incorporated.

OpenFlow is a well-known example of SDN (see, e.g., N. McKeown, et. al, "OpenFlow: enabling innovation in campus networks," ACM SIGCOMM Comput. Commun. Rev. 38:2, 69-74 (2008), the entire contents of which are hereby incorporated by reference herein). OpenFlow's approach is the identification of a vendor-agnostic programming abstraction for configuring the forwarding behavior of switching fabrics. Via the OpenFlow Application Programming Interface (API), network administrators can remotely reconfigure (at runtime) forwarding tables, probe for flow statistics, and redirect packets not matching any local flow entry towards a central controller for further processing and for taking relevant decisions; in essence "program" the network from a central control point, clearly separated from the Data Plane.

OpenFlow utilizes an abstract model of a programmable flow (or forwarding) table, and allows remote administration of a forwarding element's (e.g., a switch's) packet flow table by adding, modifying, and removing packet matching rules and actions. Via the OpenFlow "match/action" abstraction, a network administrator can broadly specify a flow via a header matching rule, associate forwarding/processing actions (natively implemented in a forwarding element) to the matching packets, and access bytes/packet statistics associated to the specified flow. This way, flow decisions can be made periodically or ad hoc by the controller and translated into rules and actions with a configurable lifespan, which are then deployed to a forwarding element's flow table, leaving the actual forwarding of matched packets to the forwarding element at wire speed for the duration of those rules. Packets which are unmatched by the forwarding element can be forwarded to the controller. The controller can then decide to modify existing flow table rules on one or more forwarding elements or to deploy new rules to prevent a structural flow of traffic between forwarding elements and controller.

While the centralized intelligence mechanism deployed in SDNs, including OpenFlow, provides flexibility, it nevertheless has a negative impact on performance and scalability.

Attempts have been made to address some limitations of SDNs. For example, the concept of stateful forwarding has been introduced, which starts from the premise that it can be beneficial to offload from centralized controllers to forwarding elements decisions based only on local states (versus network-wide knowledge) (see e.g., OpenState SDN project: <<http://openstate-sdn.org/>>; and G. Bianchi, et. al, "OpenState: Programming Platform-independent Stateful OpenFlow Applications Inside the Switch," ACM SIGCOMM Comp. Comm. Rev. 44:2, 44-51 (2014) ("Bianchi"), the entire contents of each are hereby incorporated by reference herein). The basic idea of stateful forwarding is to keep state information inside a forwarding element (e.g., a network switch or router) and to adapt packet forwarding depending on the current state. The state is updated according to certain rules and the data of the received packets (usually the packet headers). Traditional stateful forwarding requires keeping the current state in a dedicated state table. This state table is kept inside forwarding elements (hardware), separate from other tables in the forwarding element, most notably separate from the forwarding table(s).

Keeping state tables inside forwarding elements, however, poses a number of problems. First, the state table requires memory space. Such memory space either needs to be added to the forwarding element (which can be expensive) or is taken away from other tables (e.g. a forwarding table), which reduces the size of the latter. Second, maintaining an additional table requires appropriate management functions. Creating such management functions needs additional development effort, incurs additional equipment costs, and increases the complexity of the forwarding element making it more prone to errors.

To address issues associated with stateful forwarding, the use of packet templates (PacketTemplates) has been introduced. PacketTemplates are a mechanism for programming in-switch response generation to request packets for, for example, legacy control protocols. PacketTemplates can be used to generate special control packets, which are generated and then consumed by the forwarding element itself in order to enable the forwarding element to perform stateful forwarding without the need to maintain a dedicated state table. R. Bifulco et. al, "Improving SDN with InSPired Switches," Proceedings ACM Symposium on SDN Research (SOSR), (2016)—the entire contents of which are hereby incorporated by reference herein—provides a further discussion of PacketTemplates. See also U.S. Patent Publication 2016/0134727 (the entire contents of which are hereby incorporated by reference herein). However, the inventors have recognized that this PatentTemplate approach includes an undesirable cost of generating an additional control packet that is looped back to be processed by the same, originating forwarding element.

SUMMARY

Embodiments of the present invention provide a forwarding element that includes a control engine and a forwarding table. The control engine includes a command template that includes a stateful interaction instruction. The forwarding table includes a rule entry that defines a match description and an action instruction. The forwarding element is configured to: receive a packet; determine packet attributes based on the packet; compare the packet attributes to the match description to determine whether there is a rule match, execute the action instruction in response to determining there is the rule match, which includes causing a trigger signal to be sent to the control engine, the trigger signal corresponding to the command template, and perform a stateful interaction on the packet according to the stateful interaction instruction in response to receiving the trigger signal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present invention provides a system and method for realizing state-aware software-defined networking by using command (control) templates (CommandTemplates) inside SDN-enabled forwarding elements (e.g., switches, routers, etc.). Such a command template allows the forwarding element to update quickly its forwarding rules with a short processing cycle (e.g., reduced processing cycle versus other stateful forwarding approaches, such as PacketTemplate based approaches) thereby realizing state-aware forwarding.

As mentioned previously, the inventors have recognized that the PacketTemplate based stateful forwarding approach includes an undesirable cost associated with generating an additional control packet that is looped back to be processed by the same, originating forwarding element. Embodiments of the present invention provide an improved system (and method) that eliminates both the need for a dedicated state table to realize stateful forwarding and the need for looping back a control packet, while retaining the ability to conduct forwarding based on state information.

In embodiments, the function of the state table is instead realized by a combination of rules in a forwarding table and the capability of the control engine to internally derive (or create) a match/action rule based on the entries of the forwarding table. This derived match/action rule can be communicated by the control engine of the forwarding element to its forwarding table directly through internal signaling (messaging) between the control engine and the forwarding table without the additional cost of generating and transmitting a special control packet that is then looped back and processed to create a new state-rule.

The format of such an internal message is based on a command template indicating to the forwarding table the attributes for the derived specific action.

Figure 1:
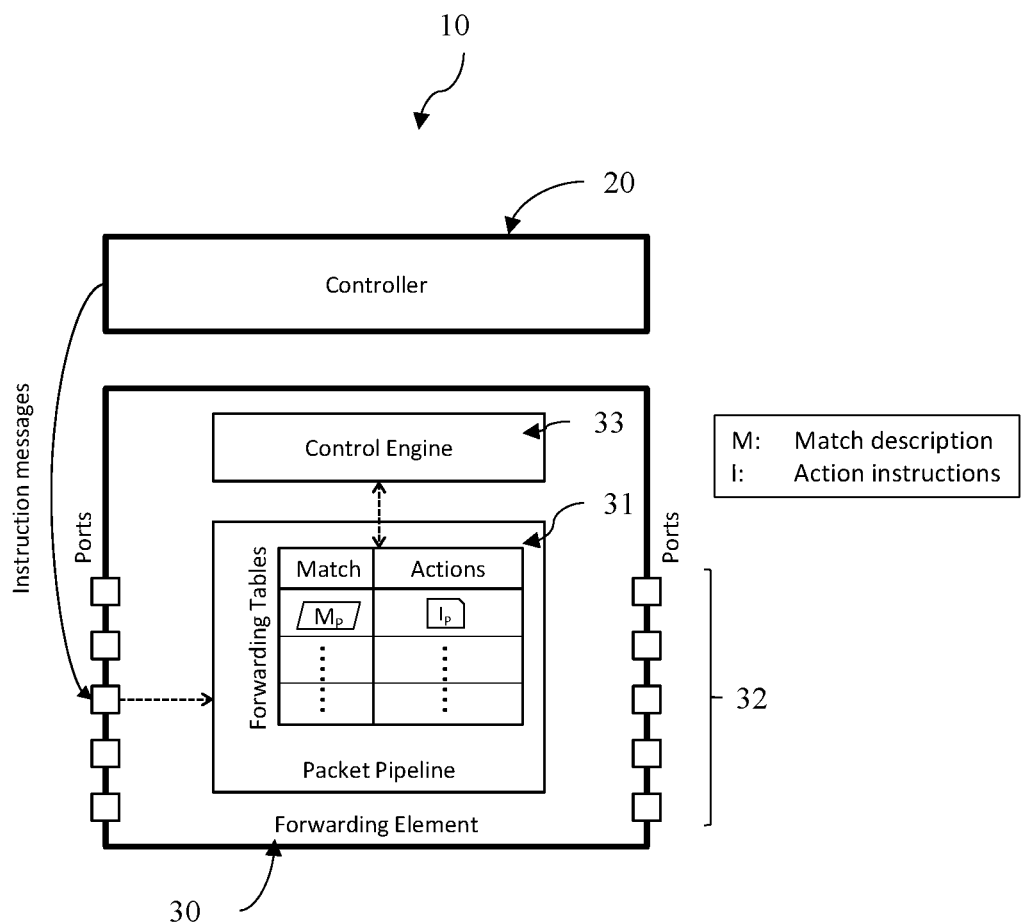
FIG. 1 illustrates SDN system architecture according to an embodiment.

FIG. 1 illustrates an SDN system architecture according to an embodiment of the present invention. An SDN system 10 includes at least one controller 20 (e.g., a centralized SDN controller) and at least one SDN-capable forwarding element 30 (e.g., switches, routers, etc.).

The forwarding element 30 contains one or more forwarding tables 31. Each forwarding table 31 contains a set of forwarding rules. Each rule includes at least a match field and an action field. The match field describes matching values for particular parts of data packets received by the forwarding element. Matching includes, for example, specific values, value ranges, and partially or completely wildcarded value sets. Matching can be done on any number of parts of the packets, for example, the header fields inside the packets (e.g. Ethernet and TCP/IP header fields).

The action field of a rule contains actions that instruct the forwarding element about what to do with packets matching the values in the match fields. Such actions can include, among others, instructions for sending out packets to specific (physical or logical) ports 32, changing specific parts of packets, and creating new packets. The creation of new packets for example, may include the control packet of a PacketTemplate based stateful forwarding extension to OpenFlow, an implementation of an SDN control protocol (see OpenFlow Switch Specification Ver 1.3.5 (April, 2015|TS-023), the entirety of which is incorporated by reference herein, for further information on the OpenFlow protocol)).

In the SDN system 10, the controller 20 instructs each forwarding element 30 how it should handle the flow of data packets (e.g., how to handle the packets flowing in and out of the forwarding element 30). The controller 20 may implement its instructions by manipulating the rules in the forwarding tables 31 of each of the forwarding elements 30. The controller 20 can, for example, send instruction messages to forwarding elements 30 in order to add, update, or remove rules in the forwarding tables 31. These instruction messages are processed by a control engine 33 of each forwarding element 30, to update the rules in their forwarding tables 31.

Embodiments of the present invention use the match and action fields in the forwarding tables 31 to implement stateful forwarding behavior. For example, a match/action rule in a forwarding table 31 of a forwarding element 30 will provide for sending instructions to the same forwarding element 30, in order to have the control engine 33 of the forwarding element 30 manipulate (e.g., add, update, delete, etc.) one or more entries in one or more of its forwarding tables 31.

According to embodiments, the forwarding element 30 has a mechanism (e.g., contains software executable to perform a method) to communicate state information to its own control engine 33. This can be achieved by a forwarding-element-internal function to send an internal signal (e.g., an interrupt signal) directly to the control engine 33, whereby this signal contains the necessary attributes defining the action rules. The format of such a direct signaling message can be defined by a command template that can be interpreted by the control engine 33.

An example of a command template according to an embodiment of the present invention and how it compares to a control message to update the switch state according to a PacketTemplate based stateful forwarding system is illustrated in Table 1.

TABLE 1

| In-switch generated control message | Command Template generated message |
|---|---|
| Ethernet protocol header (18 bytes) | Not required |
| IP protocol header (20 bytes) | Not required |
| UDP protocol header (8 bytes) | Not required |
| OpenFlow protocol header (8 bytes) | Not required |
| OpenFlow Flow_mod (>56 bytes) | OpenFlow Flow_mod (>56 bytes) |

Figures 2A, 2B, 2C:
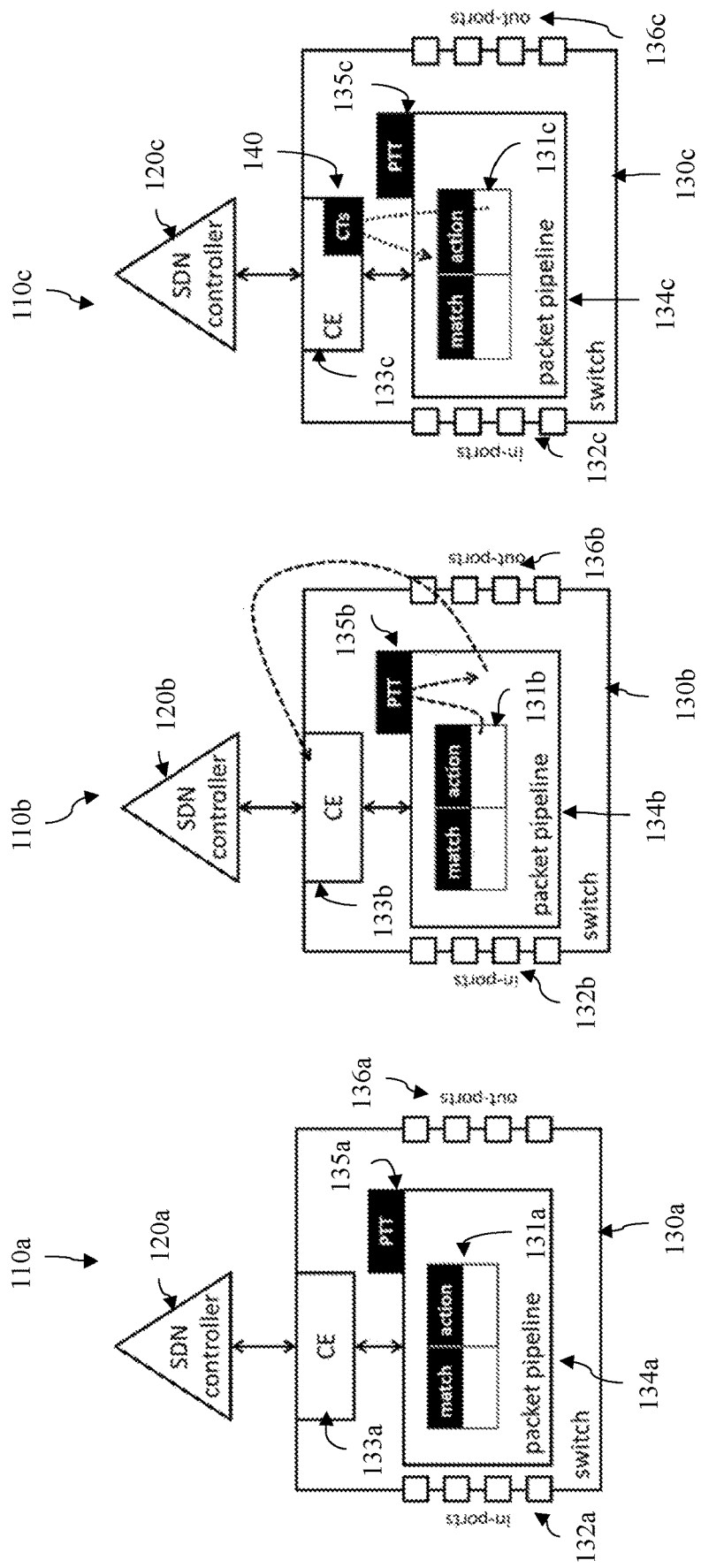
FIG. 2A illustrates aspects of an SDN system with PacketTemplate functionality.
FIG. 2B illustrates aspects of an SDN system with stateful flow processing using PacketTemplates.
FIG. 2C illustrates aspects of an embodiment of the present invention using CommandTemplates.

Some differences between the state-of-the-art (in-switch message generation, as well as using in-switch packet generation to implement stateful flow processing) and embodiments of the present can be understood with reference to FIGS. 2A, 2B, and 2C. FIG. 2A illustrates aspects of an SDN with PacketTemplate functionality. FIG. 2B illustrates aspects of an SDN with stateful flow processing using PacketTemplates. FIG. 2C illustrates aspects of an embodiment of the present invention using CommandTemplates.

Each of FIGS. 2A, 2B, and 2C illustrate a SDN system 110a, 110b, 110c, with at least one SDN controller (SDN-C) 120a, 120b, 120c and at least one forwarding element (e.g., a switch) 130a, 130b, 130c. Each forwarding element 130a, 130b, 130c contains in-ports 132a, 132b, 132c, out-ports 136a, 136b, 136c, a control engine (CE) 133a, 133b, 133c, a packet pipeline 134a, 134b, 134c, with one or more forwarding tables (match-action tables) 131a, 131b, 131c and a packet template table (PTT) 135a, 135b, 135c. Some embodiments of forwarding elements according to the present invention may not include a PTT.

FIG. 2A illustrates aspects of an SDN system 110a implementing a PacketTemplates approach. In the SDN system 110a using PacketTemplates, the protocol (or interface) between the forwarding element 130a (more specifically its CE 133a) and the SDN controller 120a is extended to include instructions for using PacketTemplates. The SDN system 110a likewise includes a mechanism for handling PacketTemplate based interactions between the CE 133a and the packet pipeline 134a. A new table, the PTT 135a, is attached (operatively coupled to or included in) to the packet pipeline 134a, which will store packet templates and which can generate new packets if triggered by an action.

FIG. 2B illustrates aspects of an SDN system 110b that uses PacketTemplates to implement stateful flow processing. The SDN system 110b, includes the features of SDN system 110a. In the SDN system 110b, stateful interactions are triggered by forwarding element local state-dependent events (such as arriving packets, timers, thresholds, etc.). The forwarding table 131b may include a match/action that defines the trigger event and the trigger action. The trigger action can include an instruction to trigger a particular entry in the PTT 135b. Once triggered, the PTT 135b generates a control message according to the existing protocol (interface) between the SDN controller 120b and the CE 133b. This control message can be sent to the CE 133b using several different options, including transmitting via virtual or physical output ports 136b.

In addition, this SDN system 110a implementing a PacketTemplates approach presents use-cases that can leverage the presented functionality. Such use-cases include, providing a response generation for neighbor discovery protocol, generation of a DHCP offer and DHCP acknowledgement messages, controlling when and how in SDNs ICMP messages are generated, SDNC learning and tracking IP ↔MAC-address mapping and responding to ARP requests, SDN configuration of CBPDU processing in spanning tree protocols, and generically responding to request packets originating from non-SDNs or legacy network control protocols. See e.g., U.S. Patent Publication 2016/0134727 (discussing use cases for PacketTempates). All these use-cases are also supported by the CommandTemplate approach of embodiments of the present invention.

FIG. 2C illustrates aspects of an embodiment of the present invention using CommandTemplates. Embodiments of the present invention can implement some or all of the features of SDN systems 110a and 100b, as appropriate for their application. The SDN system 110c, uses a CommandTemplate approach instead of (or in addition to) using a PacketTemplate approach for implementing stateful flow processing (state flow forwarding). The CommandTemplate SDN system 110c, uses command templates (CTs) 140, which reside (e.g., directly reside) in the CE 133c. The SDN system 110c implements a signal between the forwarding table 131c and the control engine 133c, to enable stateful flow forwarding. Compared to the PacketTemplate based approach, a CommandTemplate based method avoids costly packet generation and transmission; however, it requires new interactions between the CE 133c and the packet pipeline 134c.

Embodiments of the present invention also use the match and action fields in the forwarding tables 131c to implement stateful forwarding behavior. For example, a match/action rule in a forwarding table 131c of the forwarding element 130 will provide for sending instructions to the same forwarding element 130c, in order to have the control engine 133c of the forwarding element 130c manipulate (e.g., add, update, delete, etc.) one or more entries in one or more of its forwarding tables 131c. This can be achieved by a forwarding-element-internal function to send an internal signal (e.g., an interrupt signal) directly to the control engine 133c, whereby this signal contains the necessary attributes defining the action rules. The format of such a direct signaling message can be defined by the command template that can be interpreted by the control engine 133c.

Embodiments of the present invention may leverage the functionality of command templates in several (different or complementary) ways.

For example, embodiments can use an implementation that does not require changes to the SDN-controller-to-CE interface. In this embodiment, the CE 133c automatically infers (e.g., is programed to be able to determine) one or more correct command templates from one or more packet templates that are targeting the CE 133c itself. This is an autodetection method. This allows a local optimization in the case where CommandTemplate functionalities are present, which is transparent to the SDN controller.

In an implementation of this embodiment, command template entries are manipulated (added, updated, deleted, etc.) based on receiving packets originating from the PTT 135c and inferring or deriving command template data from the packet. For example, a network manager by cause a CT packet to be sent to the forwarding element 130c. The forwarding table 131c may include a match/action that defines the trigger event and the trigger action, which includes an instruction to trigger a particular entry in the PTT 135c that relates to manipulating a command template. Once triggered, the PTT 135c generates a CT manipulation control message targeting the CE 133c. This CT manipulation control message is sent to the CE 133c by transmitting via the forwarding element's 130c ports 136 and through the SDN-C-to-CE interface. The CT manipulation control message is based on existing SDN-C-to-CE protocols/interface.

As another example, embodiments add explicit control over CommandTemplates to the SDN-controller-to-CE interface. This control is implemented as a CommandTemplate extension to the OpenFlow protocol, similar to the PacketTemplate extension to OpenFlow. For example, an extension to the OpenFlow protocol could be added to include a command MOD_CT sent from the SDN-controller 120c to the CE 133c, the MOD_CT command including instructions for modifying one or more command templates 140 of the CE 133c. Here, a network administrator could define a new command template (e.g., corresponding to a stateful forwarding instruction) and cause the SDN-controller 120c to send an appropriate MOD_CT command to the CE 133c to add the new command template.

In stateful approaches (including the PacketTemplate approach of FIG. 2B and the CommandTemplate approach of FIG. 2C) the SDN controller 120b, 120c can control the rules (or at least the initial set of rules) in the forwarding element 130b, 130c and is responsible for creating appropriate rules which realize the stateful forwarding function.

Examples of stateful forwarding functions that leverage embodiments of the present invention include at least those of the stateful flow processing with PacketTemplates. See e.g., Bianchi. Changes to the CE-to-pipeline interfaces are highly dependent on the implementation of the packet pipeline, and thus are not useful to model generically.

Embodiments of present invention include similarities to the "learn" action implemented in OpenvSwitch (see e.g., OpenvSwitch manual page for the ovs-ofctl program, <http://openvswitch.org/support/dist-docs/ovs-ofctl1.8.txt> lines 2182-2270, the entire contents of which are hereby incorporated by reference). Compared to the learn action, embodiments of the present invention have at least the following differences.

Embodiments of this invention are not limited to only affecting flow tables, but can make use of the complete function set realized by the control engine (e.g., all functions described in the OpenFlow protocol (see e.g., OpenFlow® Switch Specification Ver 1.3.5 (April, 2015|TS-023))). In fact, the learn action can only add or modify flow entries, and the possible actions in the added/modified flow entries are restricted to set_field and output actions. Embodiments of the present invention are not so limited.

Embodiments of the present invention are not limited to using values from predefined header fields, but allows the full feature set of the underlying packet creation method, including copying arbitrary bits.

Furthermore, when comparing to stateful flow processing with PacketTemplates, command templates are not limited to the restrictions of the SDN control protocol, but can leverage the full programmability exposed by the packet pipeline interface (e.g. OF-DPA).

Methods and systems according to the present invention realize stateful forwarding using switch-generated messages and forwarding tables. Embodiments may include an initialization or a setup phase. A setup phase may include, for example, installing one or more command templates or inferring command templates from SDN controller programming.

Figure 3A:
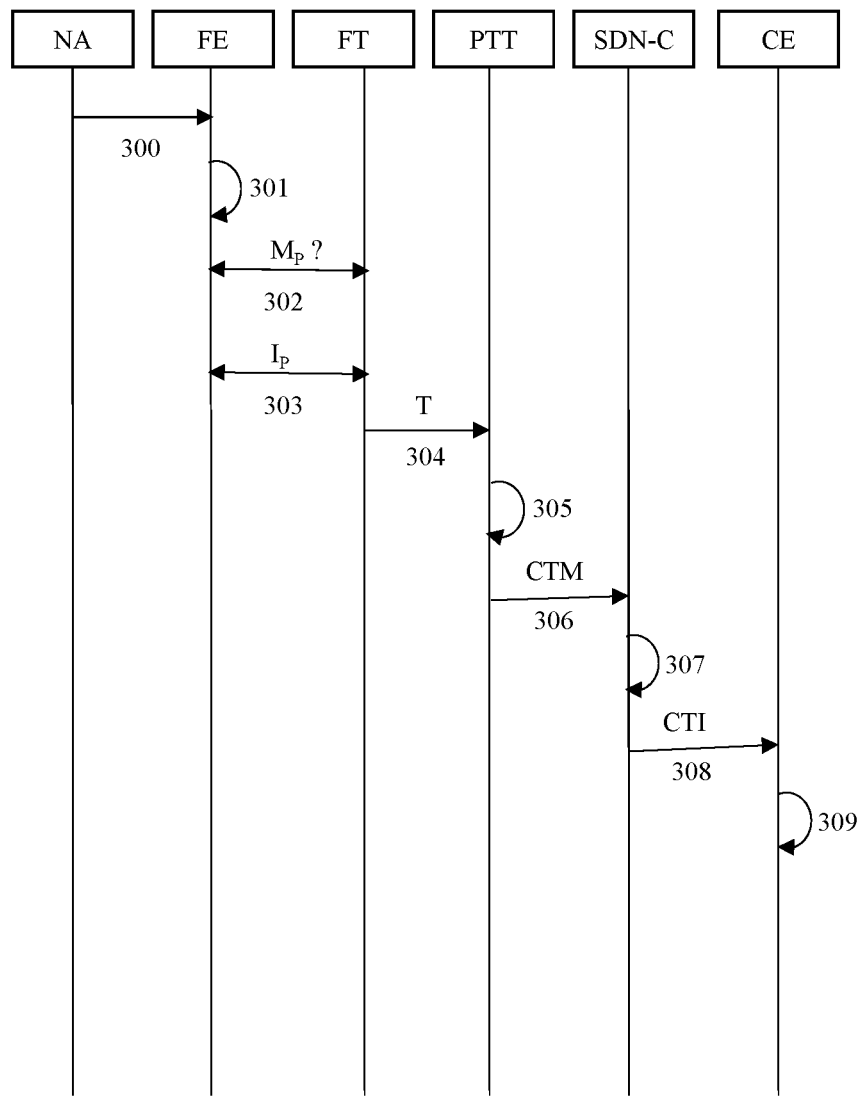
FIGS. 3A and 3B are signal flow diagrams illustrating methods of installing or inferring command templates into a control element according to embodiments of the invention.
Figure 3B:
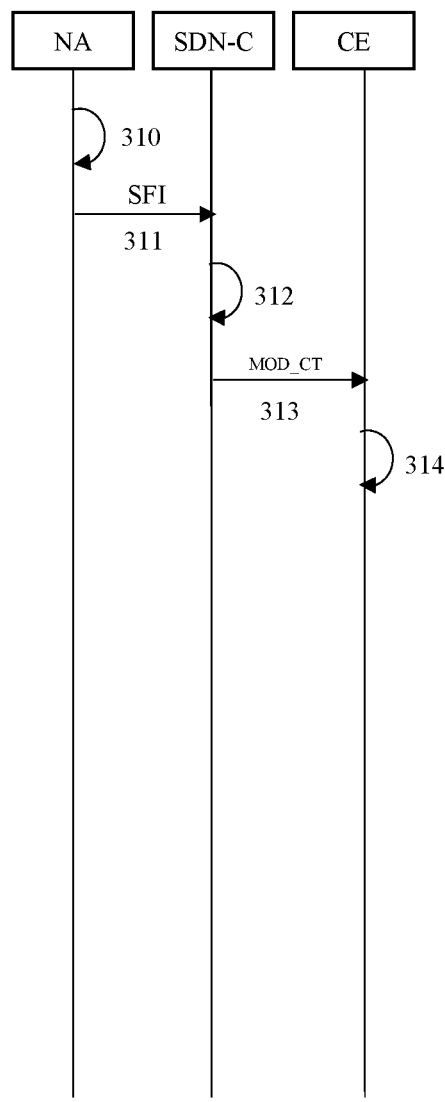

FIGS. 3A and 3B are signal flow diagrams illustrating methods of installing or inferring command templates into a control element according to embodiments of the invention.

FIG. 3A illustrates an embodiment that uses an implementation that does not require changes to the SDN-controller-to-CE interface. In this embodiment, a control element CE of a forwarding element FE automatically infers (e.g., is programmed to be able to determine) one or more correct command templates CTs from one or more packet templates PTs that are targeting the CE. This is an autodetection method. This allows a local optimization in the case where CommandTemplate functionalities are present, which is transparent to the SDN controller SDN-C.

In step 300, a network administrator NA causes a deployment packet DP to be sent in an SDN system to one or more FEs. The DP includes attributes that correspond to a stateful interaction instruction to be applied to one or more target FEs as a new or updated CT. In step 301, the FE determines the DP's attributes. In step 302, the FE finds a rule entry in its forwarding table FT where the match description $M_P$ entry corresponds to the DP's attributes. In Step 303, the FE (with its FT) begins executing the action instructions $I_P$ that correspond to the $M_P$. In step 304, the FT executes a trigger T defined in the $I_P$, which targets a particular entry in the FE's packet template table PTT. In step 305, in response to the T, the PTT generates a command template manipulation control message CTM targeting the CE. In step 306, the PTT sends the CTM to the SDN controller SDN-C. In step 307, in response to receiving the CTM, the SDN-C generates a command template modification instruction CTI. In step 308, the SDN-C sends the CTI to the CE. In step 309, the CE updates a CT or adds a new CT based on the CTI. Here, the new or updated CT corresponds to the attributes of the stateful interaction instruction sent in the DP.

FIG. 3B illustrates an embodiment that has explicit control over CommandTemplates via the SDN-controller-to-CE interface. In Step 310, a network administrator NA defines a stateful forwarding instruction SFI. In Step 311 the NA commands the SDN-controller SDN-C to deploy the SFI in one or more target forwarding elements. In step 312, the SDN-C generates a command template modification command MOD_CT corresponding to the SFI. In step 313, the SDN-C sends the MOD_CT to a control element CE of the FE. In step 314, the CE updates a CT or adds a new CT based on the MOD_CT. Here, the new or updated CT corresponds to the attributes of the SFI.

Figure 4:
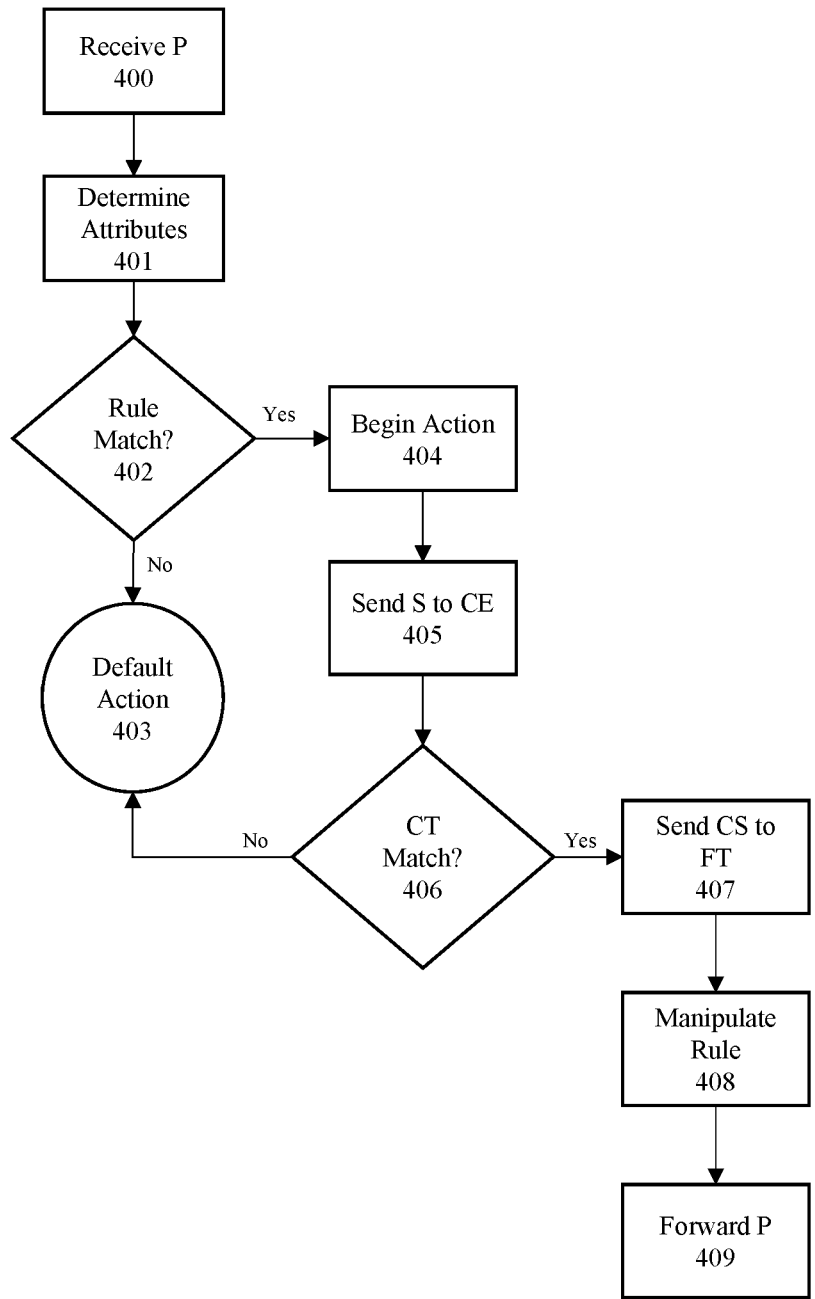
FIG. 4 illustrates a method of performing state-aware software defined networking according to an embodiment.

FIG. 4 illustrates a method of performing state-aware software defined networking according to an embodiment. With reference now to FIGS. 1 and 4, in the SDN-enabled forwarding element 30 implementing CommandTemplates, a packet P is received (e.g., received via virtual or physical ports 32) (Step 400), and its attributes are determined (Step 401). The packet's attributes are then compared to rule entries (match description/action instruction) in the forwarding table 31 (Step 402). If aspects of the packet P correspond with a match description $M_P$ (e.g., a rule—of a particular entry in the forwarding table 31—with match description $M_P$ is matching the incoming packet P), action instruction $I_P$ corresponding to the match description $M_P$ is performed with relation to the packet P (Step 404). If no match is found, a default action is performed (Step 403), which can include sending the packet to the SDN controller 20.

The action instruction $I_P$ triggers an internal function of the forwarding table 31 to generate a signal S with appropriate (or necessary) attributes and send (e.g., directly send) the signal S to the control engine 33 (Step 405). The format of the signal S is based on a command template (control template) CT. The control engine 33 executes the instructions according to the command template CT, which includes the control engine 33 manipulating (e.g., adding, updating, deleting, etc.) one or more entries rule entries in the forwarding table 31. This manipulation can be done by sending a control signal CS from the control engine 33 to the forwarding table 31 (Step 407). In embodiments, the signal is based on the manipulation signals (add, update, delete, etc.) sent by SDN controllers in OpenFlow systems.

In embodiments, the control engine 33 compares the control signal CS to one or more packet templates to determine which packet template is appropriate to use (Step 406), this is done before sending the control signal CS to the forwarding table 31.

In embodiments, the forwarding table 31 receives the control signal CS and manipulates on ore more rules based on the control signal CS (Step 408). The forwarding element 30 then forwards the packet based on the rules existing after manipulation (Step 409).

Forwarding elements (e.g., switches) according to embodiments have modifiable forwarding tables and can create special control signals and send/receive packets from these forwarding tables.

Accordingly, embodiments of the present invention provide an improved state flow processing in SDN networks. Embodiments, allow for manipulating forwarding state with switch local control interactions.

Embodiments of the present invention use direct signaling between the forwarding table and the control engine of a forwarding element to update forwarding rules in order to implement (or mimic) stateful forwarding behavior. Embodiments replace (or obviate the use of) a dedicated state table by including rules inside the packet forwarding table.

SDNs using CommandTemplates according to embodiments of the present invention have many advantages and provide improvements over current state-of-the-art SDNs, including PacketTemplate based systems and other stateful flow systems.

For example, embodiments of the present invention provide reduced complexity of forwarding element (e.g., switch) hardware because a dedicated state table is not required, yet embodiments nevertheless retain benefits of in-switch packet generation and stateful flow processing. See e.g., U.S. Patent Publication 2016/0134727 (discussing benefits related to in-switch packet generation); Bianchi (discussing benefits of stateful flow processing).

Embodiments of the present invention also provide less complexity (as compared to OpenState) of forwarding element (e.g., switch) implementation because there is no need to separately manage and maintain a dedicated state table.

The direct communication between the control engine and the forwarding table based on a switch-internal control/signal makes the process of embodiments of the present invention less costly compared to the in-switch packet generation method because it saves the processing cost of generating, transmitting and looping back a special control packet.

Embodiments also provide a more straight forward approach to program the behavior of the SDN-enabled forwarding device (e.g., by the User/SDN Controller) as compare to generating SDN control packets.

By implementing the CommandTemplate mechanism in SDN-enabled forwarding elements, embodiments provide a light-weight solution to supporting stateful forwarding. Furthermore, CommandTemplate enabled SDN controllers can delegate more control to CommandTemplate enabled forwarding elements in an efficient manner.

Figure 5:
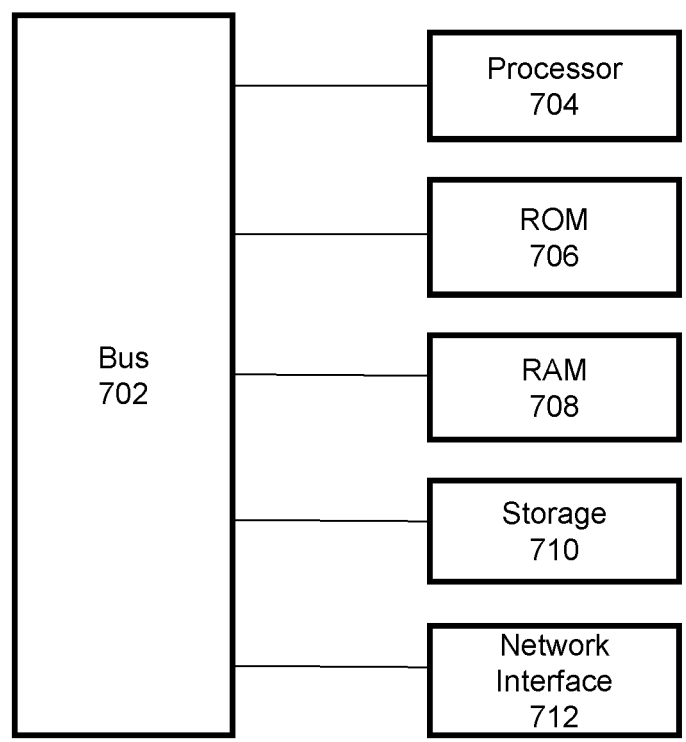
FIG. 5 is a block diagram of a processing system according to an embodiment.

FIG. 5 is a block diagram of a processing system according to one embodiment. The processing can be used to implement the protocols, devices, mechanism, systems and methods described above. The processing system includes a processor 704, such as a central processing unit (CPU) of the computing device or a dedicated special-purpose infotainment processor, executes computer executable instructions comprising embodiments of the system for performing the functions and methods described above. In embodiments, the computer executable instructions are locally stored and accessed from a non-transitory computer readable medium, such as storage 710, which may be a hard drive or flash drive. Read Only Memory (ROM) 706 includes computer executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A forwarding element comprising:
    a control engine including a command template, the command template including a stateful interaction instruction, and
    a forwarding table, the forwarding table including a rule entry, the rule entry defining a match description and an action instruction,
    wherein the forwarding element is configured to:
        receive a packet;
        determine packet attributes based on the packet;
        compare the packet attributes to the match description to determine whether there is a rule match,
        execute the action instruction in response to determining there is the rule match, which includes causing a trigger signal to be sent to the control engine, the trigger signal corresponding to the command template, and
        perform a stateful interaction on the packet according to the stateful interaction instruction in response to receiving the trigger signal.

2. The forwarding element according to claim 1, wherein the forwarding table is configured to send the trigger signal to the control engine.

3. The forwarding element according to claim 1, wherein the control engine is configured to manipulate a flow rule entry of the forwarding table as part of performing the stateful interaction, the flow rule defining how the packet should be forwarded by the forwarding device.

4. The forwarding element according to claim 3, wherein the control engine is configured to manipulate the flow rule entry by sending a control signal to the forwarding table, the control signal containing instructions for the forwarding table to manipulate the flow rule entry.

5. The forwarding element according to claim 1, wherein the control engine is configured to:
receive a command template modification command from a controller, and
modify the command template based on the command template modification command.

6. The forwarding element according to claim 5 further comprising a packet template table including a packet template entry,
wherein the packet template table is configured to:
receive a template trigger signal,
determine whether the template trigger signal corresponds to the packet template entry, and
in response to determining the template trigger signal corresponds to the packet template entry, generate and send a template packet based on the packet template entry, the template packet corresponding to the template trigger signal, and
wherein the command template modification command is based on the template packet.

7. The forwarding element according to claim 1, wherein the forwarding element is a switch or a router.

8. The forwarding element according to claim 1, wherein the forwarding element is configured to operate in an OpenFlow based system.

9. The forwarding element according to claim 1, wherein the stateful interaction corresponds to a local state of the forwarding element.

10. The forwarding element according to claim 1,
wherein the control engine includes a plurality of command templates, which include the command template,
wherein the forwarding table includes a plurality of rule entries, each rule entry defining a corresponding match description and a corresponding action instruction, the rule entries including the rule entry,
wherein the forwarding element is configured to compare the packet attributes to the corresponding match description of at least two of the rule entries to determine whether there is the rule match, and
wherein the control engine is configured to determine which of the command templates corresponds to the trigger signal.

11. A method of performing state-aware software defined networking with a forwarding element capable of communicating with a controller, the forwarding element comprising a control engine, which includes a command template having a stateful interaction instruction, and a forwarding table, which includes a rule entry defining a match description and an interaction instruction, the method comprising:
receiving, by the forwarding element, a packet;
determining, by the forwarding element, packet attributes based on the packet;
comparing, by the forwarding element, the packet attributes to the match description to determine whether there is a rule match,
executing, by the forwarding element, the action instruction in response to determining there is the rule match, which includes causing a trigger signal to be sent to the control engine, the trigger signal corresponding to the command template, and
performing, by the forwarding element, a stateful interaction on the packet according to the stateful interaction instruction in response to receiving the trigger signal.

12. The method according to claim 11, wherein the forwarding table sends the trigger signal to the control engine.

13. The method according to claim 11 further comprising:
manipulating, by the control engine, a flow rule entry in the forwarding table, the flow rule defining how the packet is to be forwarded by the forwarding device; and
forwarding, by the forwarding element, the packet according to the flow rule.

14. The method according to claim 11 further comprising:
receiving, by the control engine, a command template modification command from the controller, and
modifying, by the control engine, the command template based on the command template modification command.

15. The method according to claim 14, wherein the forwarding element comprises a packet template table including a packet template entry, the method further comprising:
receiving, by the packet template table, a template trigger signal,
determining, by the packet template table, whether the template trigger signal corresponds to the packet template entry, and
in response to determining the template trigger signal corresponds to the packet template entry, generating and sending, by the packet template table, a template packet based on the packet template entry, the template packet corresponding to the template trigger signal,
wherein the command template modification command is based on the template packet.

* * * * *